(No Model.)

H. J. WELCH.
TROLLING APPARATUS.

No. 489,110. Patented Jan. 3, 1893.

Witnesses
C. J. Williamson.
P. J. Rogers.

Inventor
Henry J. Welch,
by Franklin H. Hough

UNITED STATES PATENT OFFICE.

HENRY JUSTUS WELCH, OF CARTHAGE, ASSIGNOR OF ONE-HALF TO CALVIN V. GRAVES, OF NATURAL BRIDGE, NEW YORK.

TROLLING APPARATUS.

SPECIFICATION forming part of Letters Patent No. 489,110, dated January 3, 1893.

Application filed October 25, 1892. Serial No. 449,946. (No model.)

*To all whom it may concern:*

Be it known that I, HENRY JUSTUS WELCH, a citizen of the United States, residing at Carthage, in the county of Jefferson and State of New York, have invented certain new and useful Improvements in Trolling Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in trolling devices, and it has more particular reference to that class of trolling apparatus in which live bait is employed.

The invention has for its object to provide a device of this character by the use of which the fish or other living object which is used as bait may be incased within a transparent receptacle through which a constant circulation of water is maintained, whereby the bait may be kept alive for an indefinite length of time; thus avoiding the necessity of frequently adjusting or renewing the bait. It has heretofore been necessary, where live bait has been employed for trolling purposes, to fasten the fish used as bait to the hooks, by passing the hooks through the body of the fish, thus inflicting painful injuries to the fish which soon result in its death, and a renewal of the bait is found to be necessary.

My invention is clearly illustrated in the accompanying drawings, which, with the letters of reference marked thereon form a part of this specification, like letters of reference indicating the same parts through out the several views, and in which drawings;—

Figure 1:
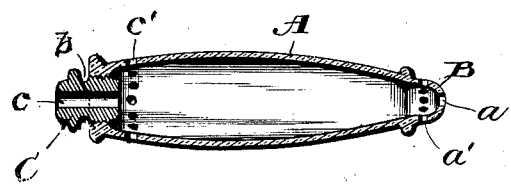
Figure 2:
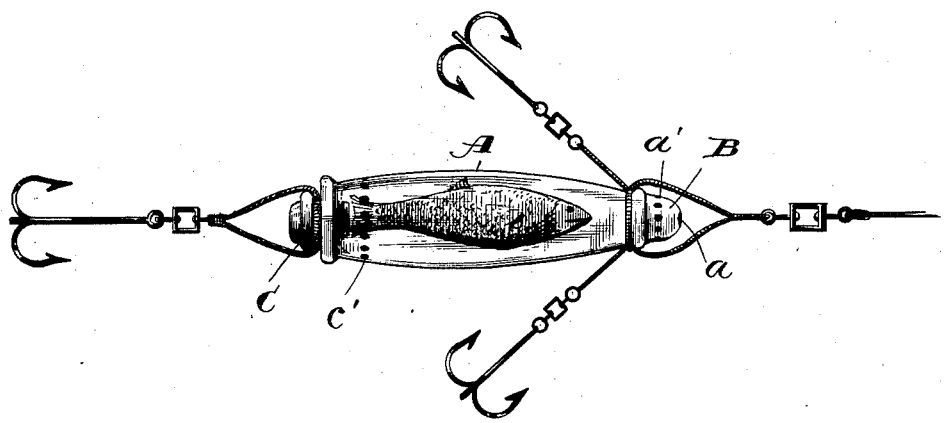

Figure 1, is a sectional view of the bait holding receptacle, and, Fig. 2, is a side view of the device complete, with the line and hooks attached and the bait inclosed.

Reference now being had to the details of the drawings by letter, A designates an elliptical chamber of some transparent substance, preferably glass. The ends of the chamber are truncated, and provided with caps B and C respectively, which will now be particularly described. The cap B may be constructed integral with and forming a part of the chamber A, or, if preferred it may be constructed separately and be adapted to be readily attached to the end of the chamber by screw-threading or in any other suitable manner. This cap is provided with an opening at its extreme end, as shown at $a$, for the admission of water into the chamber, and, if desired supplementary openings $a'$, may also be provided, though these last named openings are not in all cases necessary. The cap or cork C at the opposite end of the chamber A is adapted to be fitted into the open end of the chamber, and the rear portion of the cap is provided with a peripheral groove $b$ for convenience in attaching the line or snell carrying the hooks, as will be readily understood. The cap C is also provided with an opening $c$ for the passage of the water, and when desired the rear end of the chamber A may be provided with similar openings $c'$ for a like purpose.

In Fig. 2 of the drawings I have illustrated but one of the numerous arrangements which may be adapted, with reference to the disposition of the line and hooks. It will of course be understood that this arrangement may be varied, as experience may dictate or circumstances may require.

In use, the fish or other form of live bait to be used is placed within the chamber A, by removing the cap or cork C. The cork is then replaced, and the device is in readiness for use. It will be seen that the movement of the device through the water will cause a continuous current of water to be maintained through the chamber, keeping the bait alive for an indefinite period of time.

While I have described a particular form of chamber or bait receptacle, and prefer this form, still it is at once evident that the form or size of the chamber may be varied with out departing from the spirit of my invention, which contemplates broadly the use of a transparent inclosing chamber for bait in fishing.

Having thus described my invention, what I claim to be new and desire to secure by Letters Patent, is;—

1. In a trolling device, a transparent receptacle adapted to receive the bait and provided with openings for the passage of water through the receptacle, and snells or lines attached to said receptacle and carrying hooks substantially as and for the purpose described.

2. In a trolling device of the character described, the combination with a transparent chamber having one of its ends provided with a perforated cap, and its opposite end closed by means of a cork or its equivalent, said cork being provided with a peripheral groove, of a snell or line having one of its ends secured within said groove, and carrying hooks, substantially as described and for the purpose specified.

In testimony whereof I affix my signature in presence of two witnesses.

HENRY JUSTUS WELCH.

Witnesses:
A. Y. STEWART,
A. I. BAILEY.